United States Patent [19]

Herry et al.

[11] 3,790,716

[45] Feb. 5, 1974

[54] SYNCHRONIZATION CIRCUIT FOR A PCM-TDM EXCHANGE

[75] Inventors: Michel Jean Herry, Aulmay-Sous-Bois; Augustin Lejay, Verrieres-le-Buisson, both of France

[73] Assignee: International Standard Electric Corporation, New York, N.Y.

[22] Filed: Dec. 6, 1971

[21] Appl. No.: 205,082

Related U.S. Application Data

[63] Continuation of Ser. No. 5,381, Sept. 12, 1969.

[52] U.S. Cl. .......... 179/15 BS
[51] Int. Cl. .......... H04j 3/06
[58] Field of Search ........ 179/15 BS, 15 AQ, 15 AL, 179/15 AT; 178/69.5 R

[56] References Cited

UNITED STATES PATENTS

| | | | |
|---|---|---|---|
| 3,524,937 | 8/1970 | Herry | 179/15 BS |
| 3,281,536 | 10/1966 | Dupieux | 179/15 AT |
| 3,585,306 | 6/1971 | Battocletti | 179/15 AQ |
| 3,458,659 | 7/1969 | Sternung | 179/15 AQ |

*Primary Examiner*—Kathleen H. Claffy
*Assistant Examiner*—David L. Stewart
*Attorney, Agent, or Firm*—James B. Raden; Marvin M. Chaban

[57] ABSTRACT

A channel synchronization control circuit is disclosed for a PCM telecommunication system in which for each group of trunks there is provided a synchronization circuit with data memories for each trunk. Each message is constituted by a plurality of digits equal to the number of trunks. Received message signals are stored in a buffer memory in which the time modification due to failure of channel synchronization can be corrected. The circuit continuously checks the channel synchronization and continuously applies such corrections as are necessary.

2 Claims, 40 Drawing Figures

Figures 2, 6:
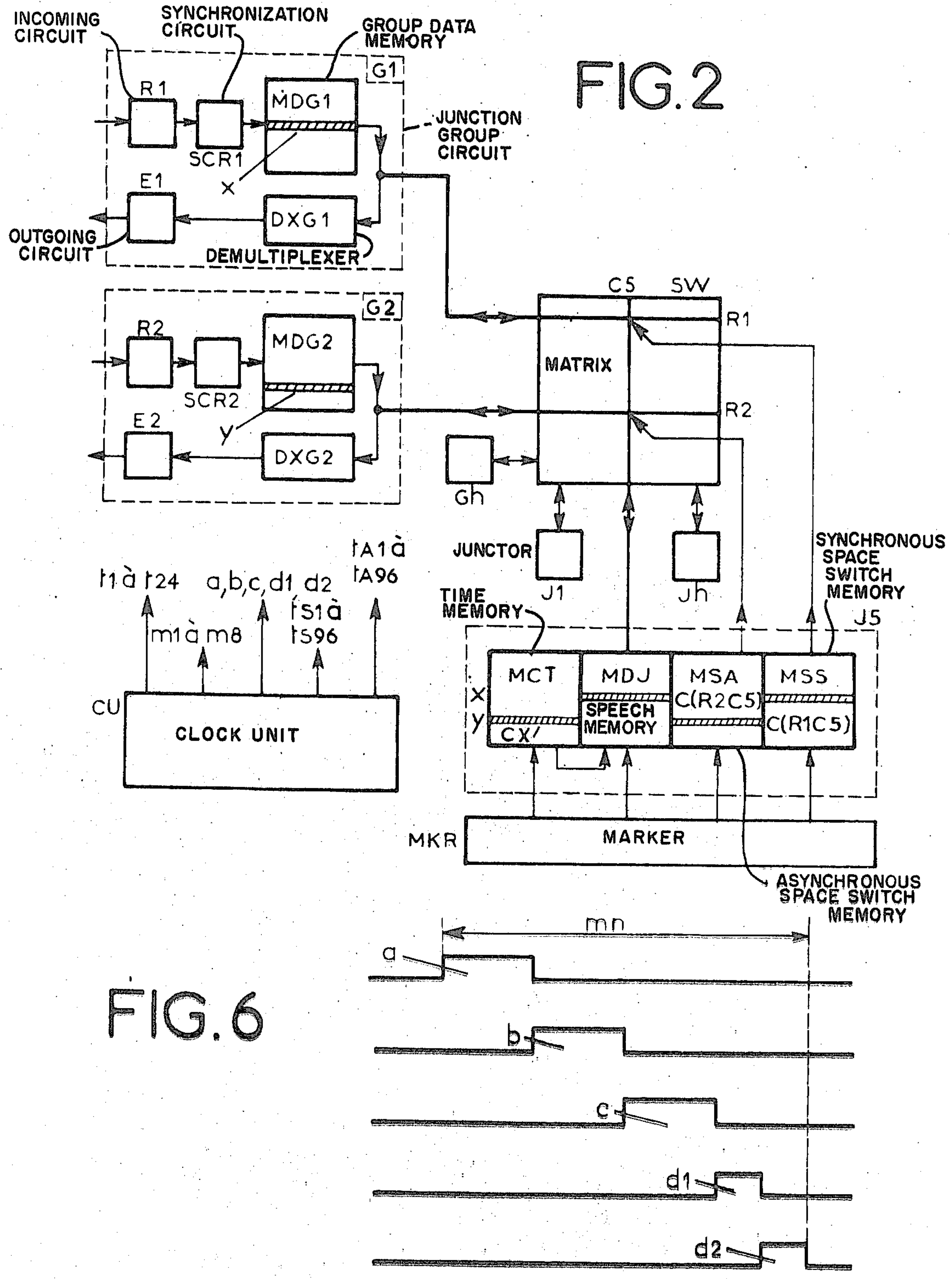

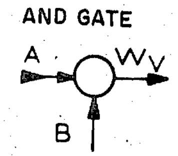
Fig.1.a
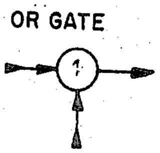
Fig.1.b
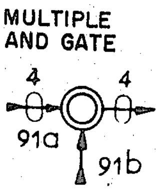
Fig.1.c
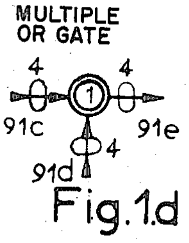
Fig.1.d
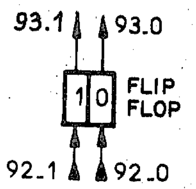
Fig.1.e
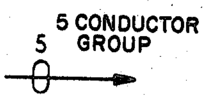
Fig.1.f
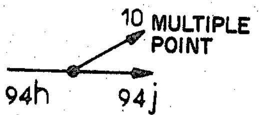
Fig.1.g
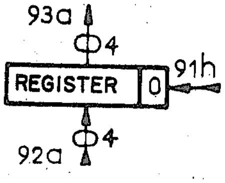
Fig.1.h
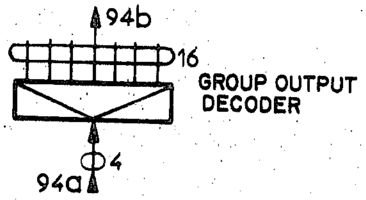
Fig.1.i
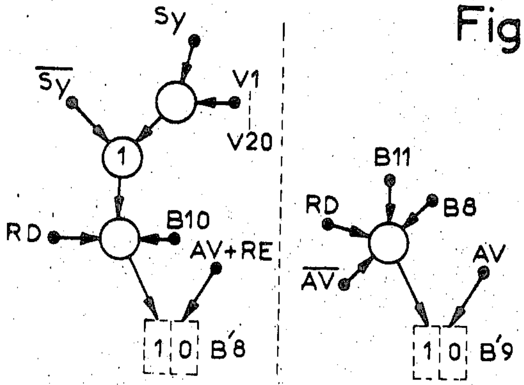
Fig.9.a
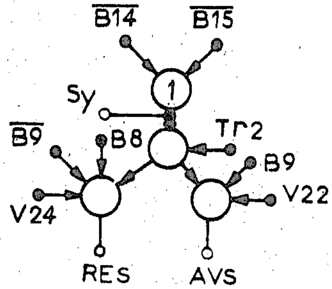
Fig.9.b
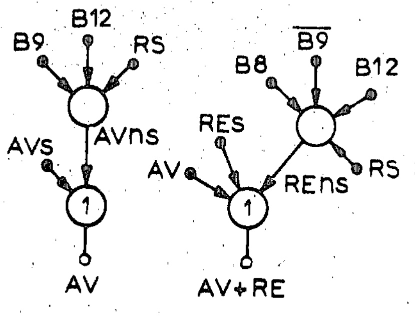
Fig.9.c Fig.13.a
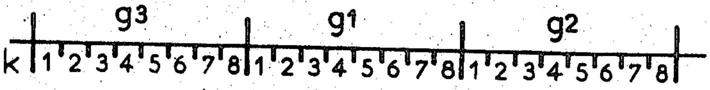
Fig.13.b
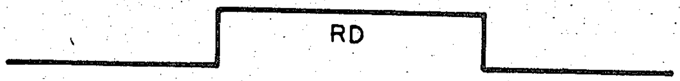
Fig.13.c
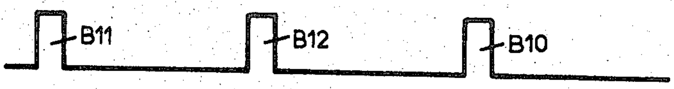
Fig.13.d
Fig.13.e
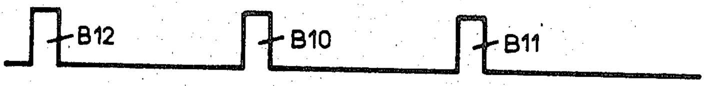
Fig.13.f
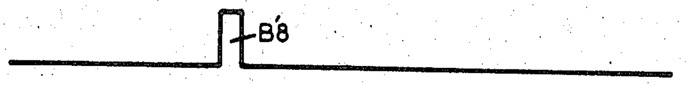
Fig.13.g
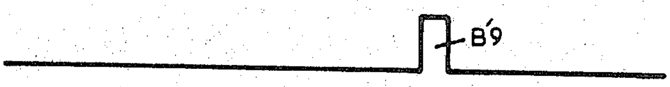
Fig.14.a Fig.14.b
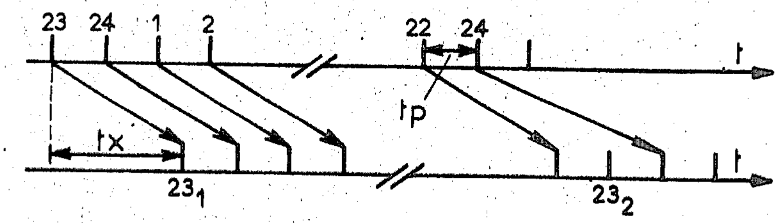
Fig.15.a Fig.15.b
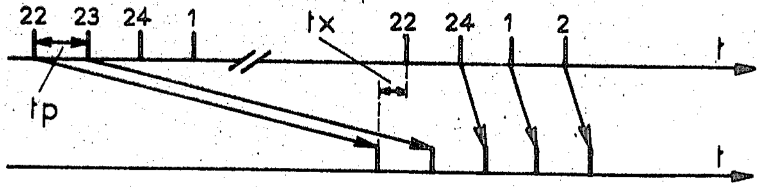
Fig.16.a Fig.16.b
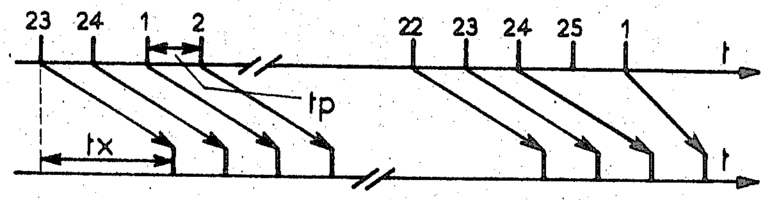
Fig.17.a Fig.17.b
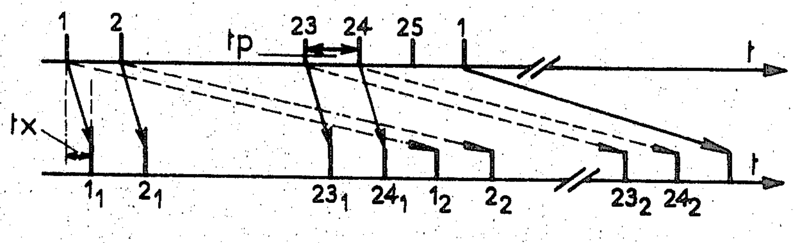

SYNCHRONIZATION CIRCUIT FOR A PCM-TDM EXCHANGE

This is a continuation of U.S. Pat. application Ser. No. 5,381 Filed Sept. 12, 1969.

The present invention concerna synchronization circuits associated with each switching central exchange of a data transmission network operating in time division multiplex and in pulse code modulation or PCM.

These synchronization circuits will be described, as an example, in their application to a PCM system presenting the following features :

repetition period or frame $T_R = 125$ number of channels per junction or trunk, terms which may be used interchangeably herein: $m = 24$ number of binary digits constituting the transmitted message on a channel $p = 8$ a pulse or message signal is transmitted when the corresponding digit is 1.

Each central exchange of the network comprises an independent local clock providing the following signals :

channel time slot signals numbered *t*1 through *t*24 which divide each frame into 24 channel time slots of equal duration. Each of these signals has a duration $tp = 5{,}208$ microseconds ;

digit time slot signals numbered m1 through m8 which divide each channel time slot into eight time slots of equal duration. Each time slot thus defined is more particularly used for the transmission in a serial form, from the central exchange, of one of the digits of a message ;

elementary time slot signals which divide each digit dslot into elementary times *a, b, c dl 1 and d*2 the durations of which will be defined during the description.

Together these signals define the time HC of the central exchange.

The transmission of the messages between the two central exchanges is done through a junction which comprises two lines respectively reserved to the transmission of A towards B and to the transmission of B towards A.

For the needs of the transmission and of the switching, each of the junctions terminating at a given central exchange is identified by a special code called junction code. On each junction, each of the m channels is identified by the code of the time slot at which it is received, the homologous channels of the two lines constituting a junction being identified by the same code.

When the message signals are transmitted from the central exchange B to the central exchange A, they are adjusted, in the sending central exchange, on the time scale (digit time slot signals) set up by the local clock of this central exchange. If we consider, as an example, that the transmission comprises an uninterrupted sequence of digits 1 or message signals, it means that a signal is transmitted at each digit time slot defined by the clock of the central exchange B.

Actually we know that, in a transmission, the positions in time of the message signals are affected by disturbances which can be classified in slow drift, phase jitter and synchronization loss.

A — Slow drift : it is a small variation in the repetition frequency of the signals, which can be considered as a difference in phase of the signals received in the exchange A compared with the signals provided by the local clock of this exchange. It is due to modifications of the propagation condition in the transmission medium (telephone line, radio link, etc . . . ) and to the relative drift of the clocks of the exchanges B and A. It will be noted that the period of the beating between the received signals and the clock signals of the exchange A is very large ($10^4$ to $10^5$ seconds) so that the difference in phase can keep the same sign during very long periods. Consequently if a unit period time Tu is considered, the number of message signals received during this time Tu is actually never equal to the number of digit time slot signals provided by the clock of the exchange A, during the same time.

Therefore the purpose of the switching stage in the exchange is to establish, for each communication between subscribers, a connection between two channels which may belong to different junctions affected by drifts without any correlation between them. Consequently, to establish such connections, it is necessary to use a common timing which is the time HC of the exchange.

So, supposing that, for a given junction, the digit time slot m5 of the channel time slot *t*21 (time slot *t*21.*m*5 of the junction) is reserved to the processing of the fifth message signal belonging to the channel 21, the consequence of the drift is that the position in time of this message signal has a slow variation and coincides in succession, for a given sign of the difference in phase, with the time slot signals *t*21.*m*6, *t*21.*m*7, *t*21.*m*8, *t*22.*m*1, *t*22.*m*2 etc . . . which are at the time HC of the central exchange. It is thus seen that a signal of the channel 3 can be received during the time reserved to the processing of the channel 4, then of the channel 5, etc . . . and that the messages are completely disturbed.

B — Phase jitter : it is a quick drift of the message signals on either side of the average position in which they should be if they were only affected by drift. It is due to several causes such as crosstalk between lines, induction effect of stray periodical signals, the interactions between the signals successively transmitted when the transmission medium introduces amplitude and phase distortion, etc . . .

The phase jitter disturbs the transmission and the switching, and its amplitude increases according to the length of the transmission line, so that it could reach one or two digit time slots and cause message perturbation.

C — Synchronization loss : it occurs when it has been impossible to balance the slow drift or when there is a channel synchronization loss due either to an important perturbation in the transmission or at the starting of the exchange. The messages are then received during time slots which have no relation with those reserved to their processing and the operation of the exchange is completely disturbed.

Before explaining briefly the means used to eliminate the effects of those perturbations, it will be noticed that in the system according to the invention, on each incoming line, a buffer memory or data memory has been located, memory in which the messages are written as they are received and read out cyclically to be transmitted through the switch. This data memory comprises *m* lines and *p* columns, each line being allocated for the storing of the signals corresponding to one of the channels. Therefore during each frame, the information corresponding, for example, to the channel 13, are written on the line 13 of the memory and are available in parallel. The address selection signals in this memory will be referenced V1 through V24.

The operating mode of these memories has been described in detail in the case M. Herry — J.P. Le Corre – G.R. Yelloz 1-7-1 U.S. Pat. No. 3,274,339 issued Sept. 22, 1966 for TDM Transmission System.

In general, the suppression of the phase jitter is achieved by storing the message signals the duration of which is short in comparison with that of a digit time slot (one or zero, five elementary time slots for instance), in a second buffer memory named phase corrector and preceding the data memory ; the writing selection signals of this memory have the duration of a digit time and are obtained from the received signals on the junction. So, a total jitter amplitude ranging about a digit time slot is handled. The message signals are read under the control of signals at the time HC, so that they are cleared of any jitter.

To compensate the effects of the slow drift, an error signal is elaborated by comparing the average frequency of the received signals with that of a clock signal. The difference between these two frequencies being very small, it is a phase detection which is generally carried out in a digital detector providing discrete information on the amplitude and the sign of the difference in phase. This error signal is then used to modify the writting and/or reading time of the buffer memories so that the received messages are stored at the exact addresses which are provided to them in the data memory.

It is known that the period of the signal provided by a phase detector is equal to the beating period $T_B$ between the signal trains which are compared, this period $T_B$ being the duration during which the number of signals in the two trains corresponds to an exact difference of one. It is thus understood that, despite of the corrections which have just been mentioned, some signals could be lost when they are written in the data memory.

In order to be able to synchronize a junction, it is necessary to send a synchronization code CSy with a position in time precisely defined. This synchronization code CSy can, for example, be transmitted, as it has been described in the case M.J. Herry — J.L.R. Jamet 2-1 U.S. Pat. No. 3,524,937 is Aug. 18, 1970 for Synchronization Circuits in a PCM Central Exchange during the time reserved to the twenty-fourth channel and it is said that the junction is synchronized when the code CSy is received just as the line 34 marked for this channel is selected for writing in the data memory. If the position in time of this code and of the selection signal V24 are compared, an error signal characterizing the synchronization loss is obtained when the said positions do no longer coincide.

The different junctions connected to the exchange being selected cyclically, the detection of such an error signal controls, on this junction, the starting of the channel synchronization operations which are :

a. a first checking of the received code at the channel time slot V24 during three frames.

b. a search for the synchronization code if three non-coincidences have been detected.

c. an error correction obtained by causing an advance in the stepping of the selectors of the phase corrector and/or the data memory ;

d. a second checking.

In the PCM system to which the synchronization circuits according to the invention are intended for the synchronization code CSy is made up with the group of the first binary digits of the messages from the ninth to the twenty fourth channel and the said code is only transmitted once every ninety six channels. These 96 channels make up four frames of 24 consecutive channels each and the code CSy appears on the channels 9 through 24 of the frame 2.

In order to perform the channel synchronization, it is checked, for each junction, if the code CSy is received during the channels 9 through 24 of the frame 2. When detecting an error, the error signal controls the starting of the operations of channel synchronization which consists in :

a. a checking of the first signal of each code of the channels 9 through 24 of the frame 2 during two successive frames 2 ;

b. a search for the synchronization code if three consecutive errors have been detected ;

c. an error correction obtained by causing the advance of the stepping of the column selector for writing in the phase corrector ; this stepping is achieved with regular intervals when the search has not succeeded during the said interval.

In the channels 1 through 8 of the frame 2 and the channels of the three other frames, the first digit of each message has another meaning. Thus, the first digit of the messages of the channels 1 through 8 in the frame 2, and of the messages of the channels in the frame 4 is used to transmit information of any kind ; the first digit of the channel messages in the odd frames 1 and 3 are used for the signalling function in the PCM network.

The object of the present invention is therefore to allow the writing of each message transmitted on a time multiplex junction, at the particular address which is assigned to it in a data memory, by eliminating the effects of the slow drift, the phase jitter and the perturbations in the transmission.

According to a feature of the present invention, in a data transmission system in which the information are transmitted in groups of $p$ binary pulses, we make up groups of $p$ junctions in which a particular digit time slot is reserved to the processing of the messages received on each junction and each junctions group circuit comprises p incoming trunk circuits, a group data memory, a group instruction memory with a cyclical scanning providing the information of address selection in the group data memory and the phase corrector of each junction circuit, the information of frame number, the information of drift error provided by each junction circuit, the information of the in or out of synchronism state of each junction provided by a synchronization code detector common to the junctions group circuit, the information of the in or out of order state of each junction.

According to another feature of the present invention, each incoming junction circuit comprises a circuit which elaborates a "risk of error" signal, a phase corrector constituted by a memory with v lines each having $p$ digits in which the signals received serially on the junction are written one after the other in the said phase corrector and are read in parallel form, by a line selection signal elaborated from the information provided by the group instruction memory, to be transferred to the address of the group data memory selected at that time slot by the said group instruction memory, a circuit to control the advance of the column selector of the phase corrector ; the drift error information provided by the group instruction memory is used to modify the selection address of the phase corrector and of the group data memory.

Another feature of the present invention consists in the fact that, for each junction, the number of successive checkings of the synchronization code CSy having provided an error is counted, that a search for the synchronization code is started when the number of checkings having provided an error is equal to three, that the search for a synchronization code for a junction consists in looking if the first digit in N successive messages corresponds to the N digits of the synchronization code, that, at equally time intervals, the writing column selector of the phase corrector is stepping up by one position when the search has given no result at the end of the said interval, that, at the end of a given delay, the received messages on the desynchronized junction are no longer transmitted into the group data memory, that the junction normally re-operates as soon as the synchronization code has been detected.

Figure 3:
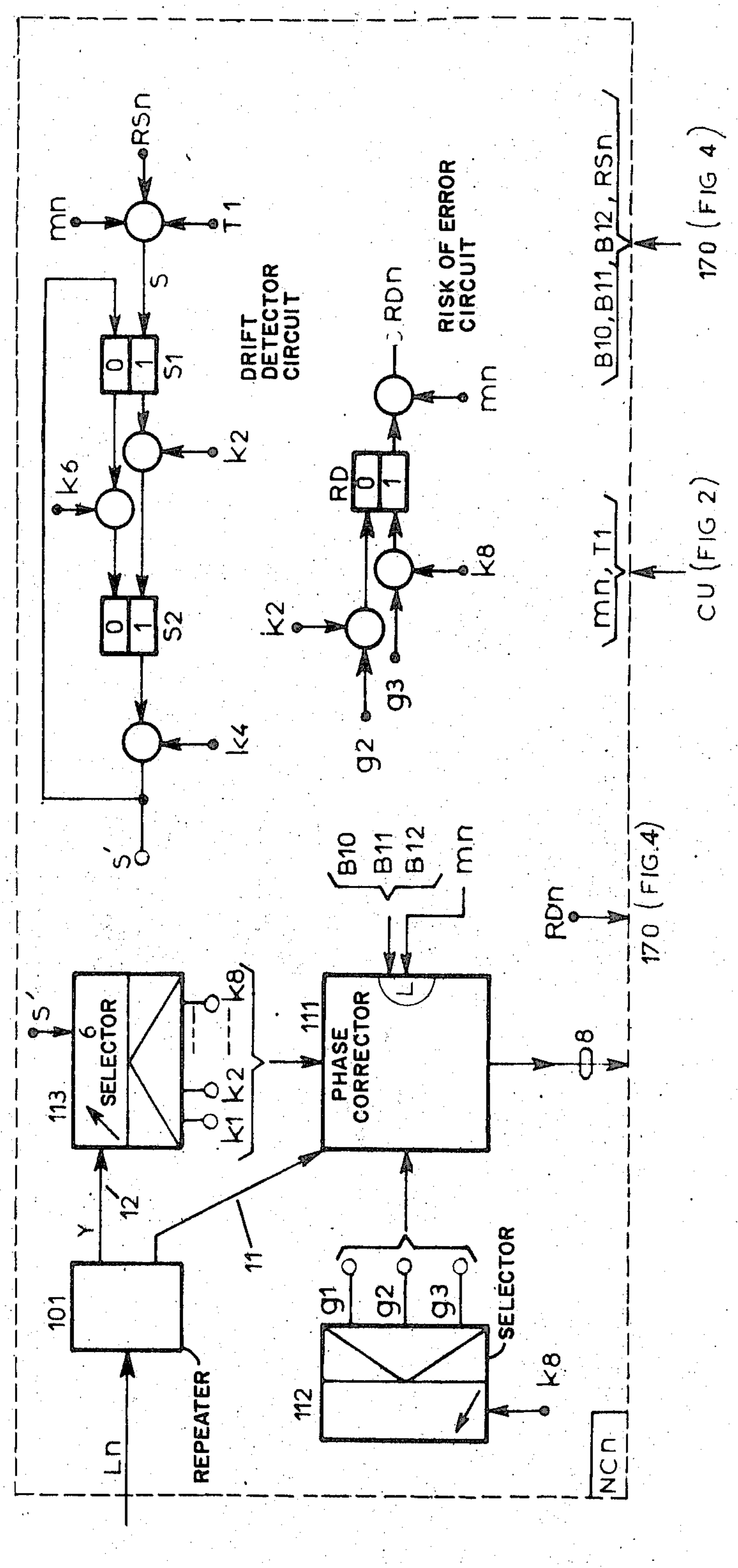
Figure 4:
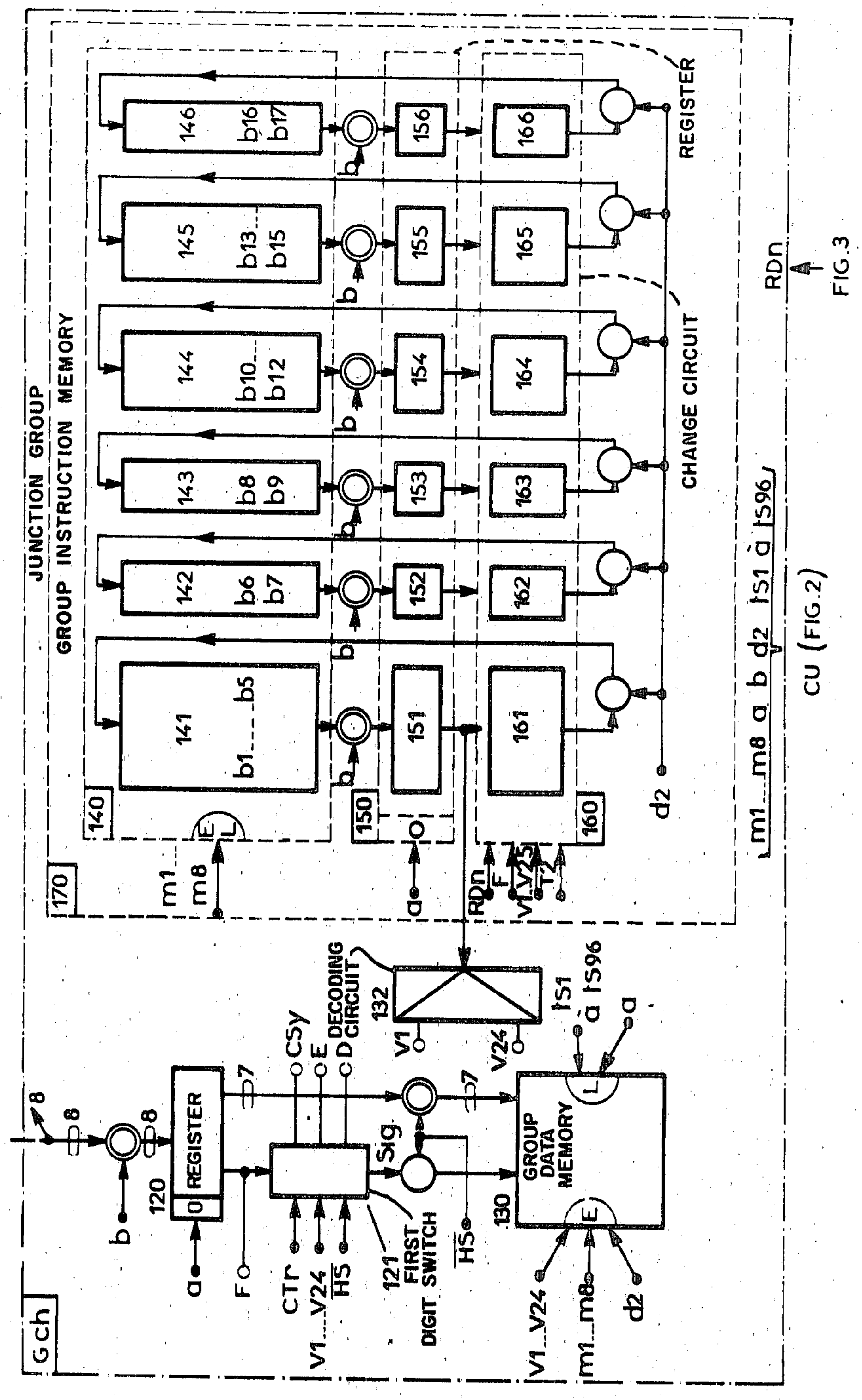
Figures 5, 10:
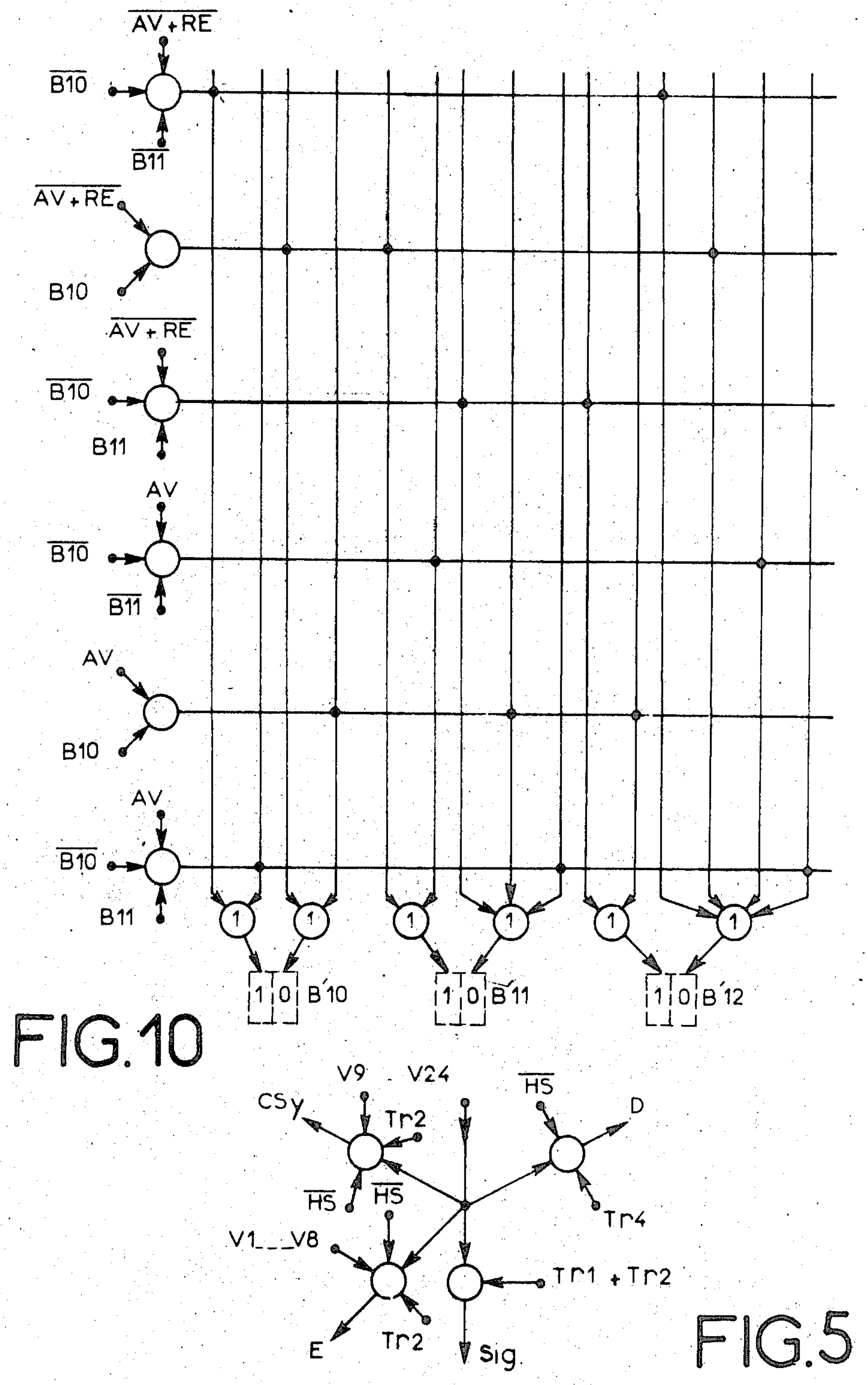
Figure 7A:
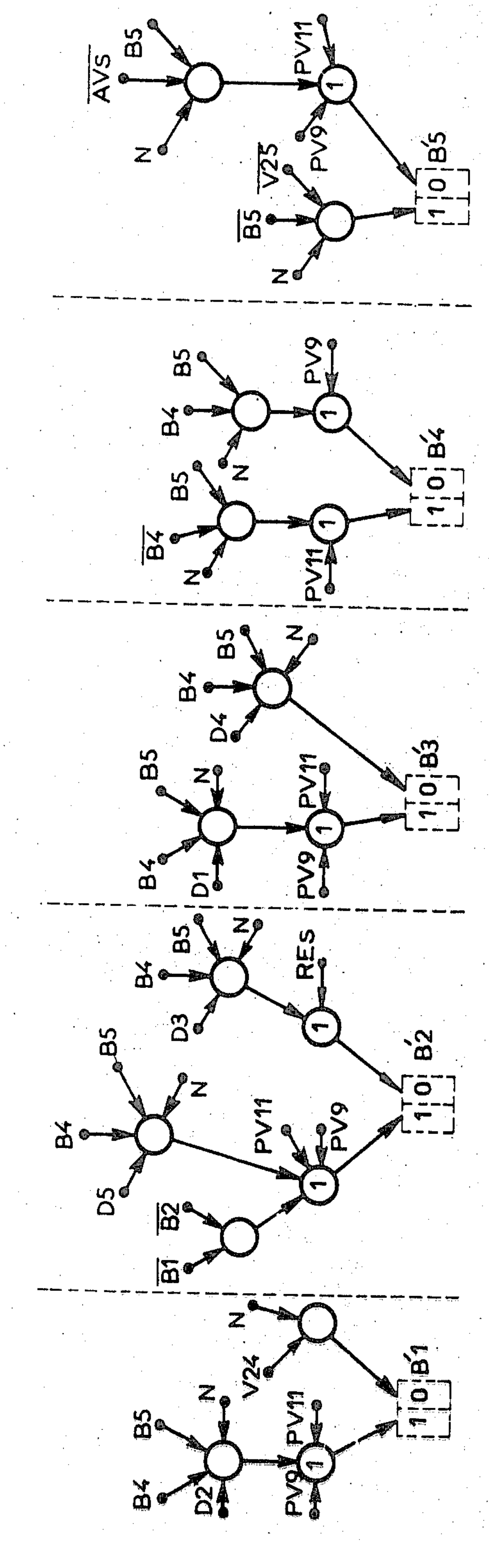
Figure 7B:
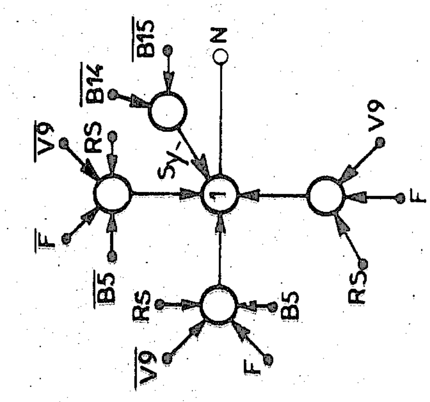
Figure 18A:
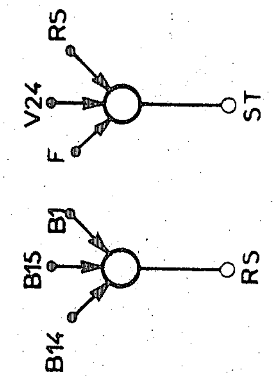
Figure 18B:
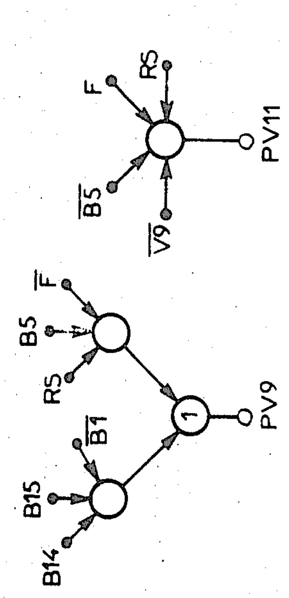
Figure 8:
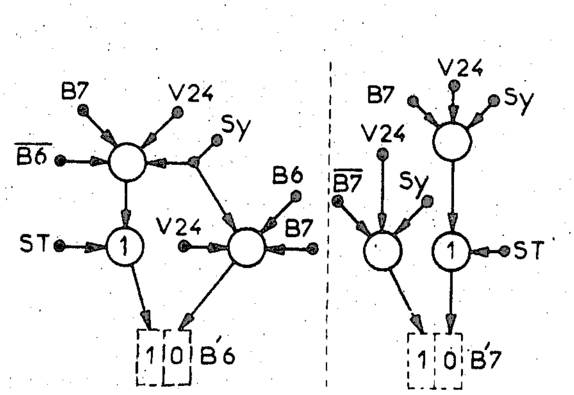
Figure 11:
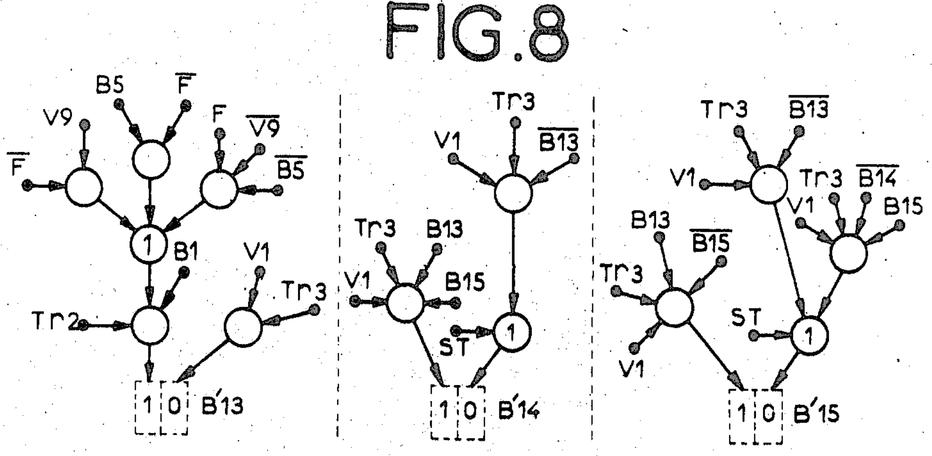
Figure 12:
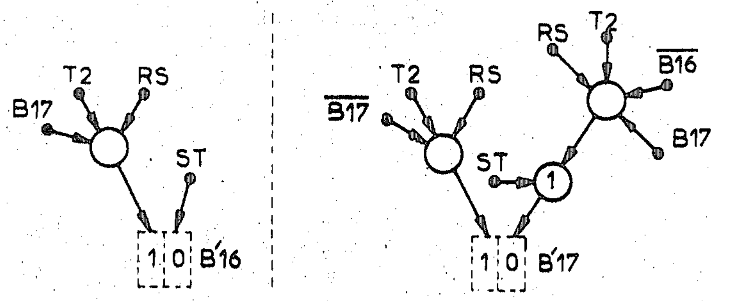

The above mentioned and other features and objects of this invention will become apparent by reference to the following description taken in conjunction with the accompanying drawings in which :

The FIGS. 1.*a* to 1.*i* illustrate symbols used in the following drawings ;

The FIG. 2 represents the block diagram of a central exchange operating code modulation ;

The FIG. 3 represents the detailed diagram of a junction or trunk circuit ;

The FIG. 4 represents the diagram of a junction group circuit ;

The FIG. 5 represents the detailed diagram of the switching circuit of the first digit of each channel message ;

The FIG. 6 represents the succession of elementary time slots *a*, *b*, *c*, *d*1, *d*2 which divide each digit time slot *mn* ;

The FIGS. 7.*a* and 7.*b* represent the channel counter ;

The FIG. 8 represents the frame counter ;

The FIGS. 9.*a*, 9.*b*, 9.*c* represent the drift detection circuit ;

The FIG. 10 represents the line counter ;

The FIG. 11 represents the checking circuit of the synchronization code and the counting circuit of the number of checkings having provided an error ;

The FIG. 12 represents the delay circuit to put out of order a desynchronized junction ;

The FIGS. 13.*a* through 13.*g* represent diagrams of signals the object of which is to make clear the operation of the drift detection ;

The FIGS. 14.*a*, 14.*b*, 15.*a* and 15.*b* represent diagrams the object of which is to make clear the information loss in the group data memory during a jump operation ;

The FIGS. 16.*a*, 16.*b*, 17.*a* and 17.*b* represent diagrams the object of which is to make clear the absence of information loss in the group data memory during a delay operation ;

The FIGS. 18.*a* and 18.*b* represent the circuit for searching the synchronization code ;

Before describing the invention, we shall briefly discuss the logic algebra notations which will be used herein in order to simplify the description of the logic operations. The subject has been treated extensively in numerous papers and in particular in the book "Logical design of digital computers" by M. Phister (J. Wiley — publisher).

Thus, if a condition characterized by the presence of a signal is written A, the condition characterized by the absence of the said signal will be written $\overline{A}$.

These two conditions are linked by the well known logical relation $A \times \overline{A} = O$, in which the sign "*x*" is the symbol of the coincidence logic function or "AND" function.

If a condition C appears only when conditions A and B are simultaneously present, one writes $A \times B = C$ and this function may be carried out be means of a coincidence or AND circuit.

If a condition C appears when at least one of two conditions E and F is present, one writes $E + F = C$ and this function is carried out by means of a mixing gate or OR circuit.

Since these AND and OR logic functions are commutative, associative, and distributive, one may write :

$A + B = B + A$ ;

$A \times (B + C) = A \times B + A \times C$ ;

$(A + B)(C + D) = A \times C + A \times D + B \times C + B \times D$ ; etc . . .

Lastly, a function of two variables A and B may present four possible combinations and, if one writes $A \times B$, the three other combinations are globally represented by the expression $\overline{A \times B}$.

If one characterizes condition A by digit 1 and condition $\overline{A}$ by digit 0, condition $\overline{B}$ by digit 1 and condition B by digit 0, the combination $A \times B$ can be written 11, the combination $\overline{A} \times B$ can be written 01, etc . . .

One will also specify, in relation with the FIGS. 1.*a* to 1.*i* the meaning of some particular symbols used in the drawings of the present patent :

The FIG. 1.*a* represents a coincidence electronic gate called simple AND circuit, which provides a positive signal on its output when its inputs, represented by the arrows touching the circle, simultaneously receive a positive signal. If the signals present on each of its two inputs are called A and B, this circuit performs the logical condition written $A \times B$.

The FIG. 1.*b* represents a mixing electronic gate, called OR circuit which provides a positive signal on its output when a positive signal is applied on at least one of its inputs represented by the arrows touching the circle. If the signals present on each of the two inputs are called E and F, this circuit performs the logical condition written $E + F$.

The FIG. 1.*c* represents a multiple AND circuit, that is to say comprising, in the case of the example, four AND circuits having a first input terminal connected to each one of the connectors 91*a* and a second input terminal connected to a common conductor 91*b*.

The FIG. 1.*d* represents a multiple OR circuit which comprises, in the case of the example, four OR circuits with two inputs 91*c* and 91*d*, and which delivers, over the four output conductors 91*e*, the same signals as those applied over either of the input terminals.

One will say that an input terminal of an AND circuit is activated when a signal is applied on the said input, and that the AND circuit is on if all its input terminals are simultaneously activated.

The FIG. 1.*e* represents a bistable circuit or "flip-flop" to which a control signal is applied on one of its input terminals 92–1 or 92–0 in order to set it in the 1 state or to reset it in the 0 state. A voltage of same polarity as that of the control signal is present, either on the output 93–1 when the flipflip is in the 1 state, or on the output 93–0 when it is in the 0 state. If the flipflip is referenced B1, the logical condition which characterizes the fact that it is in the 1 state will be written B1 and that characterizing the fact that it is in the 0 state will be written $\overline{B1}$.

The FIG. 1.*f* represents a group of several conductors, five in the considered example.

The FIG. 1.*g* represents a multiplexing of conductors, that is to say that, in the shown example, ten output conductors 94*j* are connected in parallel to the same input conductor 94*h*.

The FIG. 1. *h* represents a flipflop register. In the case of the figure, it comprises four flipflops having their inputs 1 connected to the conductors of the group 92*a* and their outputs 1 connected to the conductors of the group 93*a*. The digit 0 placed at one end of the register means that this latter is cleared to zero when a signal is applied on the conductor 91*h*.

The FIG. 1. *i* represents a decoder which, in the case of the example, transforms a four digits binary code applied by the group of conductors 94*a* into a code 1 out of 16 codes, that is to say that a signal appears on only one among the 16 conductors 94*b* for each one of the numbers applied at the input.

In the case of the description, one will frequently use the reference of a signal preceded by the letter C to name the binary code the decoding of which gives the said signal. Thus, CV1 designates the code to which the signal V1 corresponds.

At last, one will note that, in the different figures associated with the description the electronic gates (AND, OR circuits) are not referenced. In fact, every gate is unambiguously indentified, in the text, by the logical equation describing the function it performs and by the figure number, the reference of each elementary signal being set near the corresponding input terminal. thus, the AND circuit of FIG. 1.*a* would be defined as the logical circuit delivering a signal Wv for the logical condition A × B (FIG. 1.*a*).

Besides, the circuits described in the present invention use a given number of cyclically processed memories which can be classified, for a greater convenience, into two distinct types : the message memories and the semi-permanent memories.

The common feature of all these memories which comprise $r_o$ rows each of them designed for the storage of a number of $c_o$ digits, is that at least one of the reading or writing operations is cyclically done under the control of $r_o$ selection signals successively and cyclically applied to the $r_o$ rows of the memory.

A message memory which comprises *p* columns for the storage of the *p* digits of a message and a number of rows which depends on its function, is characterized by the fact that the duration available for writing each message is limited. So, it will be used in the described circuits :

- the phase corrector which is a memory comprising three lines and in which a message is stored during at most two channel time slots. In that memory the writing and reading are cyclically done ;
- the data memory comprising 24 lines assigned to the 24 channels of a junction and in which the messages are cyclically written and cyclically read. In that memory a message is stored during at most a frame.

The term "semi-permanent memory" means, in that description, memories in which the information can stay stored during any duration.

Thus, it will be used in the described circuits :

- the path memory in which are stored the instructions of reading address selection in data memories or of address selection in the switch (see description of the FIG. 2) ;
- the group instruction memory in which each line stores the information corresponding to a channel of a junction belonging to a junctions group (see description of the FIG. 4). This memory is cyclically processed and the information are modified, if needed, before writing.

To make easier the description of the invention, this one will be divided into four chapters divided as follows :

1 — Study of the switching stage
2 — Junction and group circuits
3 — Pulse synchronization
4 — Channel synchronization

1 — STUDY OF THE SWITCHING STAGE

A mode of achievement of a central exchange, in time division multiplex, and more specially of a central exchange of this type operating in pulse code modulation or PCM, has been described in the cases quoted hereunder :

a. Case E.Touraton — J.P. LeCorre 53–4 U.S. Pat. No. 3,049,593
b. Case J.G. Dupieux—P. Sénèque 1–7 U.S. Pat. No. 3,281,536
c. Case J. G. Dupieux—J. P. LeCorre—P. Seneque 2–8—8 U.S. Pat. No. 3,281,537
d. Case J. G. Dupieux—A. Pirotte 3–4 U.S. Pat. No. 3;439,124

In these cases we have described various examples of achievement of a PCM switching stage permitting to establish a link between a given incoming channel of a multiplex junction and an idle outgoing channel of another multiplex junction (or the same junction), the incoming and outgoing channels having, generally, different positions in time.

Later on, an improved central exchange has been described in the following documents :

e. "Electronics" magazines of Oct. 3, 1966. Paper by A. Chatelon, titled : "PCM telephone exchange switches digital data like a computer" (pages 119 to 126).
f. Book "Techniques of pulse code modulation in communication networks," pages 97 through 102 (Cambridge University Press — 1962 edition).

As shown on FIG. 2 this improved central exchange comprises :

- a switch SW represented under a matrix form and comprising, for example, *h* rows R and *h* columns C. The rows R1, R2 and the column C5 have only been represented on the figure and the corresponding crosspoints have been referenced R1C5 and R2C5 ;
- *h* junctions group circuits G*l* through G*h* ;
- *h* junctors J*l* through J*h* ;
- a marker circuit MKR having access to all the junctors ;

- a clock unit CU which provides the time slot signals $t1$ through $t24$, $m1$ through $m8$ which have been defined in the preample It also provides the elementary time slot signals $a$, $b$, $c$, $d1$ and $d2$ which divide each digit time slot in elementary time slots as shown on FIG. 6. Each of the signals $a$, $b$, $c$ has a duration equal to one quarter of a digit time slot and the signals $d1$ and $d2$ a duration equal to one eigth of a digit time slot. The clock unit also provides, during a repetition period or frame TR, two interleaved trains of $g/2 = 96$ signals each, that is to say the synchronous time slot signals $tS1$, $tS2$ . . . $tSx$ . . . tS96 and the asynchronous time slot signals $tA1$, $tA2$, $tAy$ . . . $t96$ ; each of these signals has a duration of a digit time slot.

Each junctions group circuit such as G1 comprises :

- a receiving circuit R1 of the messages received on $p = 8$ incoming lines ;
- a synchronization circuit SCR1 ;
- a group data memory MDG1 comprising $g = p \times m = 192$ lines ;
- a demultiplexing circuit DXG1 of the messages coming from the switch SW ;
- a circuit of emission E1 of the messages to which are connected $p = 8$ outgoing lines. Each junctor such as J5 mainly comprises a certain number of memories of $g/2 = 96$ lines, which are :
- a speech memory MDJ ;
- a time memory MCT ;
- a synchronous space switch memory MSS ;
- an asynchronous space switch memory MSA ;

The switching network of the FIG. 2 is designed to establish connections between $h$ junctions groups G$l$ through G$h$, each of them comprising $g = 192$ channels, each connection being established through one among $h$ junctors. Such a connection is made of two half connections which respectively join the incoming channel and the outgoing channel to the junctor ; one of the half connections is established at a synchronous time slot $t$S and the other one at an asynchronous time slot $t$A the serial numbers of which are generally different. A connection needs the setting up of a time switching in the junctor and two space switchings (one of each half-connection) in the switching network SW.

The time switch is formed by the association in a junctor of a speech memory MDJ and of a time memory MCT. The addressing of the speech memory is cyclically achieved under the control of the signals tS and acyclically achieved at the time slots tA under the control of the addressing codes supplied by the time memory MCT the selection of which is also cyclical.

The space switch is formed by the switch SW which electronic cross points controlled either by synchronous space switch memories MSS when a synchronous half-connection has to be established, or by asyncrhonous space switch memories MSA when an asynchronous half-connection has to be established. Such a switch permits to carry out the connection between different junctions groups such as G1 and G2.

We are going to describe briefly the time and space switching for a connection between the channel $x$ of the group G1 (half-connection G1:$t$S$x$) and the channel $y$ of the group G2 (half-connection G2:$t$A$y$) this connection using the junctor J5 (shortening of the link : G1:$t$S$x$/J5/G2:$t$A$y$).

The marker circuit MKR allocates the line $x$ of the junctor J5 for this connection and writes on the line $y$ of the memory MCT the code C$x$ defining the address $x$ of the memory MDJ. The marker circuit also writes the code C (R1C5) permitting the selection of the crosspoint R1C5 in the switch SW in the line $x$ of the synchronous space switch memory MSS. It also writes the code C(R2C5) permitting the selection of the crosspoint R2C5 in the switch SW, in the line $y$ of the asynchronous space switch memory MSA.

At the time slot $t$S$x$, the lines $x$ of the memories MDJ, MDG1 and MSS are selected and establish the half-connection G1:$t$S$x$. This one is made by a transfer of data in both directions between the junctor 15 and the group G1, that is to say first the transferring of the information contained in the line $x$ of the memory MDJ to the demultiplexing circuit DXG1, then the transferring of the contents of the line $x$ of the memory MDG1 into the line $x$ of the memory MDJ.

At the time slot $t$S$y$, the line $y$ of the memory MCT is selected at its turn and the code C$x$ which is read in it controls again the selection of the line $x$ of the memory MDJ at time slot $t$A$y$ ; the line $y$ of the memory MSA is also selected at time $t$S$y$ and the code C(R2C5) permits the operating of the crosspoint R2C5 at time slot $t$A$y$. The half-connection G2:$t$A$y$ consists first in a transferring of the contents of the line $x$ of the memory MDJ into the demultiplexing circuit DXG2, then in a transferring of the contents of the line $y$ of the memory MDG2 into the line $x$ of the memory MDJ.

Thus we see that the time switch permits to tune the time positions of the incoming and outgoing channels by delaying the information received from G1 from the time slot $t$S$x$ to the time slot $t$A$y$ and by delaying the one received from G2 from the time slot $t$A$y$ to the time slot $t$S$x$.

2 — JUNCTION AND GROUP CIRCUITS

The transferring of data between a group and a junctor is carried out in a parallel form and the setting up time of a half-connection is a digit time slot, that is to say the time slot reserved for the transmission of a message digit on a junction. So we have constituted a certain number $w$ of junctions groups G1, G2, G3 . . . G$h$ . . . G$w$, each of them comprising as many junctions as each message has digits, say eight junctions: N1, N2 . . . N8. So $24 \times 8$ connections can be simultaneously established, and the system operates as a 192 channel multiplex system.

In each group, a special digit time slot is reserved for the processing of each junction, the digit time slot $m1$ being reserved to the junction N1, the digit time slot $m2$ to the junction N2 and so on . . .

So, if on the junction N3 it is assumed that the message of channel 24 is received in $t24$, the message of channel 1 will be processed in $t1 \times m3$, the message of channel 2 in $t2 \times m3$ and so on . . .

The channel messages received on the eight junctions of the group are stored in a common memory called group data memory which comprises 192 lines.

The FIG. 3 represents the diagram of a junction circuit NC$n$ associated to the incoming line L$n$ of the junction N$n$ belonging to a group of eight junctions constituting the common circuit G$cb$. The incoming line L$n$ feeds a regenerative repeater 101 of a standard design, which provides on its output 11 normalized message signals with a duration of 100 nano-seconds and on its output 12 reference signals Y, with a duty cycle 0,5, which are at the medium frequency of the received signals.

The reference signals are applied to a selector 113 with eight positions which successively and cyclically activates one of its eight output wires, so providing the signals *k*1 through *k*8, each having the duration of a digit time slot at the time of the junction. The trailing edge of the signal *k*8 produces the stepping up of the three position selector 112 which successively and cyclically activates one of the three output wires providing the signals *g*1, *g*2, *g*3. The signals *k*1 through *k*8 are used to select the columns, and the signals *g*1 through *g*3 are used to select the lines when storing in the phase corrector 111 the normalized message signals which appear in series on the output 11 of the repeater 101. When the circuit normally operates, an eight digit message is stored in the eight memory points of a line. The extraction of the information is achieved in a parallel form, that is to say that a message stored on a line is extracted during the digit time slot mn associated to this junction.

The line to be read is shown by the information extracted from the group instruction memory, this information being available in the output register of the same memory from the elementary time slot *b* of each digit time slot.

The output signals of the memory 111 of each one of the eight junction circuits of a group are applied to the register 120 (FIG. 4) first reset to zero at the elementary time slot *a* of each digit time slot, and therefore are available during the time slot $c + d1 + d2$. At the output of register 120, the first digit of each message is applied on one hand on the checking and synchronization search circuit (terminal F), and on the other hand to a circuit 121 which carries out the switching of the first digit according to the position, within the four frames, of the channel to which it is associated. The four output terminals of the circuit 121 provide the synchronization code CS*y*, the first digit of the channels 1 through 8 of the frame 2 (signal E), the first digit of the channels of the frame 4 (signal D) and the signalling Sig. The seven other digits of the message and also the signal Sig are stored in the group data memory 130 which comprises one hundred and ninety two lines. The address in that memory is given on one hand by the digit time slot *mn* in process, and on the other hand by the identity of the channel, this latter information being available in the output register of the group instruction memory. The recording in the group data memory is carried out during the elementary time slot *d*2 of each digit time slot. As it has been seen before when studying the switching stage, this memory 130 is cyclically read. As this memory comprises $g = 192$ lines, each signal *t*S causes the reading of two lines.

The group data memory 130 actually comprises eight elementary memories of 24 lines each (one line per channel) and each elementary memory is reserved to store the received messages on one of the eight junctions of the group. The writing selection of a line of the group data memory 130 is thus obtained by selecting first one of the eight elementary memories with the signal *mn* corresponding to the junction under process, then by selecting one of the 24 lines with the channel code staticised in the output register of the group instruction memory, the said channel code being decoded by the circuit 132 of the FIG. 4.

When the junction under consideration is declared out of order following the impossibility to synchronize it after a certain time, a signal "out of order" HS prevents the recording of messages in the group data memory. This signal also prevents the distribution of the signals CS*y*, E and D. The FIG. 5 gives a detailed diagram of the switching circuit 121 (FIG. 4) of the first digit of each channel message.

All the information needed to operate the synchronization circuit of each group of junctions are provided by the circuit 170 of the FIG. 4. This circuit 170 mainly comprises a group instruction memory 140 with $p = 8$ lines of 17 digits each, the information extracted from a line permitting to process a channel of one of the eight junctions of the group. The reading and writing of this memory are cyclically carried out at the rate of one line selection every digit time slot. So, the line 1 is selected at the digit time slot *m*1 and the extracted information permits the processing of a channel of the first junction N1 in the group ; the line 8 is selected at the digit time slot *m*8 and the extracted information permits the processing of a channel of the eight junction N8 in the group. The duration of selection of a line is a digit time slot : at elementary time slot *b*, the word is extracted from the selected line and transferred into a register 150 previously reset to zero during the elementary time slot *a ;* that word is modified in a logic circuit 160 and the modified word is recorded at the time slot *d*2 in the line selected by the signal *mn*.

The binary word with 17 digits *b*1 through *b*17 which is extracted from a line of the memory 140 is divided into six groups of digits, each group having its own meaning. Thus the memory 140 is cut into six parts 141 through 146, each one corresponding to a group of digits. The first five digits *b*1 through *b*5 extracted from a line of the memory 141 indicate the channel to which corresponds the message contained in the line of the phase corrector 111 (FIG. 3) selected at the same time ; these digits constitute the codes CV1 through CV24 ; in correlation with the used digit time slot *mn*, they also give the address of the data memory 130 (FIG. 4) in which the said message will be stored.

The selected line of the phase corrector is given by the digits *b*10 through *b*12 extracted from the memory 144. As the phase corrector only comprises three lines, it is not necessary to decode the three digits b10 through *b*12 to know the selected line. Thus the code 100 (signal B10) addresses the line 1, the coded 010 (signal B11) addresses the line 2, the code 001 (signal B12) addresses the line 3. The signals B10 through B12 are the signals which appear on the output 1 of the part 154 of the register 150 and correspond to the digits *b*10 through *b*12 extracted from the memory 144.

The codes staticised on the registers 151 and 154 are modified through the circuits 161 and 164 in such a way that, on one hand, the line of the phase corrector of the junction circuit NC*n* which will be read at the following digit time slot *mn*, is the following line of the said phase corrector and that, on the other hand, the content of this line is stored in the address of the group data memory corresponding to the following channel. Generally, this change consists in obtaining the following codes of the line and of the channel ; nevertheless this change is different when the junction is declared out of synchronism or when the possibility of a simultaneous reading and writing of the same line of the phase corrector has been detected.

The code indicating the possibility of simultaneous reading and writing of the same line of the phase corrector is constituted by the digits *b*8 and *b*9 which are extracted from the memory 143. This code also shows the type of change to be made to the codes of channel and of line.

A junction is declared out of synchronism when three successive checkings of the synchronization code CS*y* have shown an error. The fact that the checking has given an error is shown by the digit *b*13 extracted from the memory 145 ; the number of successive checkings which have given an error is shown by the digits *b*14 and *b*15 extracted from the memory 145.

When a junction has been declared out of synchronism, the circuit is provided for carrying out a search of the synchronization code CS*y*. After a certain time of search, the junction is declared out of order (signal HS) but the search goes on. This search time is measured by counting the number of appearances of a signal T2 of period *t*2 = 5 milliseconds ; the state of the count up is shown by the digits *b*16 and *b*17 extracted from the memory 146. The signal HS appears after three periods *t*2.

The number of the frame is shown by the digits *b*6 and *b*7 extracted from the memory 142.

The circuit of change 160 of the seventeen binary digit word is a complex circuit receiving the output signal of the register 150 and some of the other signals, namely the signal and "risk of error" RD provided by each junction circuit (FIG. 3), the signals V1 through V25 coming from the decoding of the codes CV1 through CV25 staticised in the register 151 (FIG. 4) by the circuit 132 (FIG. 4), the signal F corresponding to the first digit of each message staticised in the register 120 (FIG. 4), a signal T2 of period *t*2 = 5 milliseconds. To make easier the explanation and the understanding of the operation of the change circuit 160, it has been cut into six circuits 161 through 166, the output signals of which correspond to the six groups of digits previously defined and are thus stored in the part of the memory 140 which is affected to them. These circuits 161 through 166 will be respectively described referring to the FIGS. 7 through 18 ; in these figures the object of the flipflops B'1 through B'17 represented in dotted lines is to show the information which will be recorded in the memory 140. These flipflops do not exist in the circuit and it is understood that the signals which are stored in the selected line of the group instruction memory are those appearing on the inputs of the said flipflops B'1 through B'17.

The FIGS. 7.*a* and 7.*b* represent the circuit 161 of the FIG. 4, circuit which will be called channel counter. The table 1 gives the codes which are actually used during the counting and also the correspondence with the channels. The first column of this table gives the signal coming from the decoding of the first three digits *b*1, *b*2 and *b*3. That table 1 shows that the digit *b*5 changes with each regular stepping up of the counter, so the flipflop B'5 (FIG. 7.*a*) sets for the signal $\overline{B5}$ and resets for the signal B5. The change of state of the flipflop B'4 is controlled by the value of the digits *b*4 and *b*5 and the table shows that it sets for the condition $\overline{B4}$ × B5 and resets for the condition B4 × B5. As far as the three digits *b*1, *b*2 and *b*3 are concerned only one of these digits changes when the condition B4 × B5 appears (except in the particular case of the change into CV25) therefore, the resulting signal of that condition is applied on the right input of the flipflop which must change its state ; the choice of the flipflop which changes its state depends on the decoding of the three digits *b*1, *b*2 and *b*3, that is to say on the signals D1 through D6. Thus, at the transition from CV4 (01011) to CV5 (01100) is one does not take into consideration the change of the digits *b*4 and *b*5 previously explained only the digit *b*3 changes and takes the value 1 ; this change is obtained by the condition D1 × B4 × B5. It will be noticed that a signal N is also necessary to obtain the changes of state of the flipflops B'1 through B'5 at the regular stepping up of the channel counter. This signal N appears for some conditions given by the FIG. 7.*b*, these different conditions will appear at the explication of the operation.

The FIG. 8 represents the circuit 162 of the FIG. 4 and concerns the frame counter. The table 2 gives the correspondence between the codes made with the digits *b*6 and *b*7 and the frame signals T*r*1 through T*r*4. The logical conditions of change of state of the flipflops B'6 and B'7 are similar to those controlling the change of state of the flipflops B'4 and B'5 of the channel counter ; nevertheless, when the circuit is synchronized (signal S*y* = $\overline{B14}$ + $\overline{B15}$), the change of state only exists if there is the signal V24.

The FIGS. 9.*a*, 9.*b* and 9.*c* represent the circuit 163 of the FIG. 4, the object of which is to determine if a jump AV or a delay RE must be operated on the line counter (FIG. 10) and on the channel counter (FIG. 7). This jump or delay information is stored to be used at the right time. A jump or delay operation must be achieved when the reading of a line of the phase corrector may occur during the writing of the same line. To detect this risk one first elaborates in each junction circuit (FIG. 3) a signal said "risk of error" RD the duration of which is greater than the writing time of the line 1 for example. An additional digit time slot is for example added on both sides of the selection signal g1 of the line 1. The diagram of the FIG. 13.*a* shows that by setting the flipflop RD (FIG. 3) for the condition *g*3 × *k*8 and by resetting it for the condition *g*2 × *k*2, the signal RD shown by the diagram of the FIG. 13.*b* is obtained on the output l of the said flipflop. By comparing this signal with the reading selection signals B10 and B11 of the lines 1 and 2, one determines if a jump or a delay must be carried out.

The FIG. 10 represents the circuit 164 of the FIG. 4 or line counter of the phase corrector. The table 4 gives the used codes and their correspondence with the lines.

The FIG. 11 represents the circuit 165 of the FIG. 4 ; the object of this circuit is to check if the junction is well synchronized (circuits associated to the flipflop B'13) and to count the number of times when an error has been detected in three consecutive synchronization codes (circuits associated to the flipflops B'14 and B'15). When the number of errors is equal to three (signal B14 × B15) and when that occurs during channel 9 (signal B1) the circuit elaborates a signal of synchronization search RS (FIG. 18.*a*).

The FIG. 12 represents the circuit 166 of the FIG. 4, the object of the said circuit being to declare the junction out of order after a certain delay. This delay is measured by the intermediary of a signal T2 of period *t*2 = 5 milliseconds ; the junction is declared out of order when the signal T2 has appeared three consecutive times in succession.

TABLE 1

| | b1 | b2 | b3 | b4 | b5 | Channel |
|---|---|---|---|---|---|---|
| D 1 | 0 | 1 | 0 | 0 | 0 | V1 |
| | 0 | 1 | 0 | 0 | 1 | V2 |
| | 0 | 1 | 0 | 1 | 0 | V3 |
| | 0 | 1 | 0 | 1 | 1 | V4 |
| D 2 | 0 | 1 | 1 | 0 | 0 | V5 |
| | 0 | 1 | 1 | 0 | 1 | V6 |
| | 0 | 1 | 1 | 1 | 0 | V7 |
| | 0 | 1 | 1 | 1 | 1 | V8 |
| D 3 | 1 | 1 | 1 | 0 | 0 | V9 |
| | 1 | 1 | 1 | 0 | 1 | V10 |
| | 1 | 1 | 1 | 1 | 0 | V11 |
| | 1 | 1 | 1 | 1 | 1 | V12 |
| D 4 | 1 | 0 | 1 | 0 | 0 | V13 |
| | 1 | 0 | 1 | 0 | 1 | V14 |
| | 1 | 0 | 1 | 1 | 0 | V15 |
| | 1 | 0 | 1 | 1 | 1 | V16 |
| D 5 | 1 | 0 | 0 | 0 | 0 | V17 |
| | 1 | 0 | 0 | 0 | 1 | V18 |
| | 1 | 0 | 0 | 1 | 0 | V19 |
| | 1 | 0 | 0 | 1 | 1 | V20 |
| D 6 | 1 | 1 | 0 | 0 | 0 | V21 |
| | 1 | 1 | 0 | 0 | 1 | V22 |
| | 1 | 1 | 0 | 1 | 0 | V23 |
| | 1 | 1 | 0 | 1 | 1 | V24 |
| | 0 | 0 | 0 | 0 | 0 | V25 |

TABLE 2

| b6 | b7 | Frame |
|---|---|---|
| 0 | 0 | Tr 1 |
| 0 | 1 | Tr 2 |
| 1 | 0 | Tr 3 |
| 1 | 1 | Tr 4 |

TABLE 3

| b8 | b9 | Meaning |
|---|---|---|
| 0 | 0 | Neither AV, nor RE. |
| 1 | 0 | RE. |
| 1 | 1 | AV. |

TABLE 4

| b10 | b11 | b12 | Line |
|---|---|---|---|
| 1 | 0 | 0 | 1 |
| 0 | 1 | 0 | 2 |
| 0 | 0 | 1 | 3 |

TABLE 5

| b10 | b11 | b12 | Logical condition |
|---|---|---|---|
| 1 | 0 | 0 | B10 |
| 1 | 0 | 1 | |
| 1 | 1 | 0 | |
| 1 | 1 | 1 | |
| 0 | 1 | 0 | $\overline{B10} \times B11$ |
| 0 | 1 | 1 | $\overline{B10} \times \overline{B11}$ |
| 0 | 0 | 1 | |
| 0 | 0 | 0 | |

TABLE 6

| 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|
| 1 | 1 | 0 | 1 | 0 | 1 | 0 | 1 | 0 | 1 | 0 | 1 | 0 | 1 | 0 | 1 |

TABLE 7

| b14 | b15 | Number of checkings |
|---|---|---|
| 0 | 0 | 0 |
| 0 | 1 | 1 |
| 1 | 0 | 2 |
| 1 | 1 | 3 |

3 — PULSE SYNCHRONIZATION

3.1 — Generalities

As previously explained, the frequency $F_J$ of the signals *k*1 through *k*8 is the average frequency of the incoming signals on a junction, Nn for example, is not exactly the same frequency as the frequency $F_C$ of the signals *m*1 through *m*8 provided by the clock of the central exchange which are used to extract the information out of the phase corrector 111 (FIG. 3). The message signals are successively stored in the eight memory points of the line 1, then in the eight memory points of the line 2 and so on. The addresses to which are achieved those readings are provided by the selectors 112 for the lines and 113 for the columns, as it has been explained previously. The information contained in a line are read in a parallel form at the digit time slot *mn* associated to the junction considered N*n*. As previously seen, the reading line selection signals are obtained from the information contained in the line of the memory 144 (FIG. 4) selected at the digit time slot *mn*.

Of course, a line must be read after it has been completely stored and before any new information is stored.

If the frequency $F_C$ of the exchange clock is greater than the average frequency $F_J$ of the signals on the junction N*n*, that is to say if $F_C>F_J$, it is understood that, in average, more information are read out of the memory 111 than stored in it, so that if a shift existed at the beginning between the digit time slot reserved to read a given line and the actual time of the writing of this last signal (in *k*8) on the same line, this shift decreases. As an example, one will suppose that the digit time slot during which the line 1 is read coincides with the storing of the fourth memory point of the line 2 selected by a signal *g*2. If the shift between the frequencies $F_J$ and $F_C$ is one unity, after one second of operation, the digit time slot during which the line 1 is read coincides with the storing operation of the third memory point of the line 2 and so on.

3.2 — DRIFT DETECTION AND RECORDING OF THE ERROR

In the circuit object of the present invention, it is agreed to elaborate a drift signal when the reading of a line of the phase corrector 111 occurs at least partly either during the time *k*1 which immediately follows the recording in *k*8, in the last memory point of this line, or during the time *k*8 which immediately precedes the recording, in *k*1, in the first memory point of this line. The first case corresponds to $F_C>F_J$, and a delay at reading must be carried out, the second case corresponds to $F_C<F_J$ and a jump at reading must be carried out. As previously seen, the line of reference which has been chosen is the line 1 and the junction circuit provides a signal RD (FIG. 13.*b*) which is compared with the reading signal B10 of the line 1 (FIGS. 13.*c* and 13.*e*). This corresponds to the condition RD × B10 (FIG. 9.*a*) which sets the flipflop B'8 (FIGS. 13.*d* and 13.*f*). To know the sign of the drift, the signal RD is compared either with the reading signal B11 of the line 2 or with the reading signal B12 of the line 3. If one chooses to do the comparison with the signal B11, the FIGS. 13.*b* and 13.*c* show that in the case $F_C>F_J$, only the signal B10 coincides with the signal RD and consequently only the flipflop B'8 sets. Thus the code 10 of the table 3, which corresponds to carry out a delay RE, is obtained. In the case $F_C<F_J$, the FIGS. 13.*b* and 13.*e* show that the signal RD coincides with the signals B10 and B11 and consequently the flipflops B'8 and B'9 set (FIG. 9.*a*) which corresponds to carry out a jump AV.

Some additional conditions are provided for the change of state of the flipflops B'8 and B'9. As one will see further on, when the junction is synchronized (signal $Sy = \overline{B14} + \overline{B15}$ — FIG. 9.*b*), the drift correction is achieved when the channel counter is in CV22 (jump) or in CV24 (delay) of the frame 2. So one understands that it is not good to make a drift detection during the channels 22, 23 and 24 of the frame 2. This interdiction is also provided during the channel 21 of the frame 2 because two digit time slots *mn* corresponding to the same junction N*n* are necessary to detect without doubt a jump or a delay.

It will be noticed that this interdiction has been applied to the channels 21 through 24 of the other frames, but this interdiction is not necessary.

When a junction is out of synchronism (signal $\overline{Sy}$), the danger of a simultaneous writing and reading of the line 1 still exists ; however, in that case, it is not necessary to prevent the drift detection during the channels 21 through 24 because there is no longer correspondence between the received channels and the channels shown by the channel counter. For the same reason, there is no drift correction on the channel counter when the junction is out of synchronism.

3.3 — DRIFT CORRECTION

Not to lose one of the signals Sig, D or E, the drift correction is achieved at the end of the frame 2 when the junction is synchronized. So, the signal of synchronized jump AVs (FIG. 9.*b*) appears on the channel 22 (condition S*y* × T*r*2 × B9 × V22) and the signal of synchronized delay RE*s* appears on the channel 24 (condition S*y* × T*r*2 × $\overline{B9}$ × V24).

The jump operation consists in not reading the line which normally should be read at the following time slot *mn* and, instead, in reading the following line. If, when the signal V22 appears, the line to read is the line 1 (signal B10) which corresponds to the channel 22, the line which will be read at the following time slot *mn* will be the line 3 which corresponds to the channel 24. So the line 2 which corresponds to the channel 23 will not be read and its content will be lost. So the signal AV*s* must have an effect on one hand on the line counter (FIG. 10) to step it up by one position, and on the other hand on the channel counter (FIG. 7.*a*) to step it up from CV22 to CV24.

In the FIG. 10, the line counter steps up from the line 3 to the line 2 for the condition AV × $\overline{B10}$ × $\overline{B11}$ from the line 1 to the line 3 for the condition AV × B10, from the line 2 to the line 1 for the condition Av × $\overline{B10}$ × B11.

It will be noticed that the operation of this counter takes into account the fact that when starting the digits *b*10, *b*11 and *b*12 can take any value. So, the eight possible codes have been divided into three groups as shown in the table 5 ; this table also shows the logical conditions of detection of these groups. So, if when starting the synchronization circuits, the digits *b*10, *b*11 and *b*12 are such that they make a code of the first group, they will give a signal B10. As the FIG. 10 shows, this signal B10 allows the recording of a correct code of the table 4 in the memory 144 (FIG. 4). By this process, the line counter correctly operates after a channel time slot.

It will be also noticed that the jump of a line when reading supposes that the phase corrector comprises at least $v = 3$ lines.

The table 1 shows that to step up from the code CV22 to the code CV24, only the digits *b*4 and *b*5 are concerned. In normal operation, one would step up from the code CV23 with *b*4 = 1 and *b*5 = 0, so that to directly step up from the code CV22 (*b*4 = 0, *b*5 = 1) to the code CV24 (*b*4 = 1, *b*5 = 1), it is only needed to keep the normal operation for the digit *b*4 and to maintain the digit *b*5 at the value 1 by allowing the value 0 of the said digit only when the signal AV*s* is absent, which corresponds to the signal N × $\overline{AVs}$ × B5 applied on the input 0 of the flipflop B'5.

The delay operation consists in reading twice the same line of the phase corrector. Therefore the line counter must stay on the same code ; in the FIG. 10, this stopping is obtained by the fact that the counter only steps up if there is the signal AV (jump) or the signal $\overline{AV + RE}$ (neither jump nor delay). About the channel counter, the delay operation consists in staticising the code of a 25th channel, channel which does not correspond to any line in the group data memory 130 (FIG. 4). Comparing with the normal operation of the counter from the code CV24 to the code CV1 (table 1), the stepping into CV25 consists in resetting the bistable circuit B'2 by the signal RE*s* applied on the input O of the flipflop B'2. The stepping from the code of the channel 25 or from the unused codes which may appear when starting, into the code of the channel 1, is obtained by setting the flipflop B'2 by the condition $\overline{B1}$ + $\overline{B2}$ which only appears for the unused codes and CV25 ; besides, the flipflop B'5 does not set because of the condition N × $\overline{B5}$ × $\overline{V25}$.

3.4 — INFORMATION LOSS

One has previously seen that the jump operation consisted in stepping over a line when reading the phase corrector and in stepping up from the channel 22 to the channel 24 in the group data memory. Therefore the message contained in the line of the phase corrector which has not been read is lost. The group data memory is cyclically written and read : the writing is achieved at the end of a digit time slot and the reading at the beginning of a digit time slot so that these two operations cannot take place at the same time.

When, during a jump operation, the writing and reading times of a same line are separated by a time interval *tx* longer than a channel time slot *tp*, the line corresponding to the channel 23 is not written and twice the same message is read, the reading being non destructive. This double reading of the message of the channel 23 will be better seen with the help of the diagrams of the FIGS. 14.*a* and 14.*b*. The FIG. 14.*a* represents the writing time slots of the channel messages in the group data memory in the case of a jump, and the FIG. 14.*b* represents the reading time slots of said channels ; the arrows between the two figures show the correspondence between writing and reading of a same message. These two figures show that a message of the channel 23 of the first frame is read a first time at $23_1$ and a second time at $23_2$.

When the reading of a line occurs before the writing of the same line with a time interval *tx* shorter than *tp* (FIGS. 15.*a* and 15.*b*), the jump from the channel 22 to the channel 24 has the effect that the reading of a line immediately follows the writing of the same line. The FIG. 15.*a* represents the serie of the writing time slots of the lines in the group data memory in the case of a jump and the FIG. 15.*b*, the serie of the reading time slots of the lines in the said memory ; the arrows connecting these two figures show the correspondence between the writing and the reading time slots of a same message. These two figures show that if, before the jump, the reading of the line of the channel 22 occurs immediately before the writing of the same line of a time $tx<tp$, after the jump from the channel 22 to the channel 24, the reading of the line of the channel 24 immediately follows the writing of the same line. This change over has the effect that the channel 24 of the frame 1 and the channels 1, 2 . . . 22 of the frame 2 are not read and that the corresponding messages are lost.

It will be noticed that this phenomena of change over is not frequent because it only appears for $tx<tp$ while the more likely value of $tx$ is to be larger than $tp$.

As the delay operation consists in reading twice the same line of the phase corrector, there is no loss of message in the phase corrector. Two cases have to be considered in the group data memory :

1. When the writing and reading time slots of the same line are separated by an amount of time $tx$ longer than $tp$ as it has been represented by the FIGS. 16.*a* and 16.*b*, no information is lost.
2. When the reading time of a line occurs immediately after the writing time of the same line ($tx<tp$), the FIGS. 17.*a* and 17.*b* show that after the stepping up into the channel 25, the reading time of the line corresponding to the channel 1 of the frame 2 occurs immediately before the writing time of the same line then corresponding to the channel of the frame 3. Then we notice that the channel 1 of the frame 2 is read twice (at $\mathbf{l}_1$ and $\mathbf{l}_2$) and the same thing occurs for the other channels of the frame 2.

The operation of the pulse synchronization circuit has been described, assuming that the junction was synchronized (signal S*y*) and that the jump or the delay was achieved by the intermediary a signal AV*s* or a signal RE*s* (FIG. 9.*b*). When the junction is out of synchronism, it is understood that a drift correction must be carried out on the phase corrector so that there is no coincidence between the writing and the reading time of the same line. It is not the same with the correction in the group data memory in which there is no more any correspondence between the line and the received channels ; therefore the correction in the group data memory, that is to say in fact on the channel counter (FIG. 7.*a*), takes place only when the junction is synchronized, that is to say in presence of the signals AV*s* or RE*s* (FIG. 9.*b*).

When the junction is out of synchronism, during a long period the channel counter may never reach the positions CV22 and CV24, the signals V22 and V24 of which allow to respectively elaborate the jump and delay signals ; therefore the drift correction could not be achieved at the right time, so it is achieved as soon as the drift has been detected. As in the particular example described, the detection is carried out with the reading signals of the lines 1 and 2 of the phase corrector, the correction on the line counter will be carried out when the reading signal B12 of the line 3 appears. Therefore the non synchronized jump signal AV*ns* appears with the condition B9 × B12 × RS (FIG. 9.*c*) and the non synchronized delay signal RE*ns* appears with the condition B8 × B9 × RS (FIG. 9.*c*). The signal RS (FIG. 18.*a*) means that the junction is out of synchronism and that the code CS*y* is searched.

3.5 — PERFORMANCES

The jump and delay operations are only made during the frame 2 so that there is no perturbation on the signals of the other frames ; therefore a jump or a delay can only be made every four frames, which corresponds to five hundred microseconds. If a danger is detected at the beginning of the frame 3, the correction can only be made at the end of the following frmae 2 ; therefore, during that time, the maximum drift of the signals HJ and HC must be smaller than a digit time slot, that is to say smaller than 650 nanoseconds. So the maximum allowed drift is $1.3 \times 10^{-3}$. As the frequency $F_C$ of the signals HC is $F_C = 1{,}536$ megacycles per second, the allowed frequency difference is about 2 kilocycles per second.

This simplified calculus does not take into account the fact that the drift detection cannot be made during the channels 21 through 24 of the frame 2 for the reasons previously explained. So, a drift detection which should have taken place at the time of the signals V21 and V22 of the frame 2 will actually be made at the time of the signals V1 and V2 of the frame 3 and the drift will only be corrected at the time of the signal V22 of the frame 2 if it was a jump, or at the channel 24 of the frame 2 if it was a delay. The maximum interval between the true danger and its correction is so slightly smaller than the one obtained by taking an interval of four frames. One easily understands that the impossibility of drift detection during the channels 21 through 24 of the other frames does not limit the performances of the apparatus.

It is easy in the circuit, object of the invention, to increase the allowed frequency drift by providing, for example, a signal said "risk of error" RD (FIGS. 3 and 13.*b*) which would have a much longer duration.

4 — CHANNEL SYNCHRONIZATION

As we have previously pointed out, the synchronization code CS*y* is made up by the whole of the first digits of the codes of the channels 9 through 24 of the frame 2. This code CS*y* is given in the table 6 in which the correspondence with the channels of the frame 2 is also given. This code CS*y* is continuously checked for each junction ; for this checking, at the output of the multiplexing register 120 (FIG. 4), the first digit F of each line of the phase corrector is applied to the circuit 160 of the FIG. 6 and particularly to the circuit 165 of the said figure. This circuit 165 is represented by the FIG. 11 which concerns the checking circuit and the FIGS. 18.*a* and 18.*b* which concern the circuit of search for the synchronization code CS*y*.

When the checking circuit of the FIG. 11 detects an error in the succession of the first digits of the codes of the channels 9 through 24 of the frame 2, the flipflop B'13 sets. This error may be detected in three cases :

either a digit 0 occurs on the channel 9 (signal $\overline{F} \times V9$)

or a digit 0 occurs on an even channel (signal $\overline{F} \times B5$)

or a digit 1 occurs on an odd channel which is not the channel 9 (signal $F \times \overline{B5} \times \overline{V9}$).

When an error has been detected (signal B13), two other checkings of the code CS*y* are made and the count of the said checkings is obtained with the digits *b*14 and *b*15 (table 7).

The flipflops B'14 and B'15 change of state, if needed, on the channel 1 of the frmae 3 if the digit *b*13 is a 1 (signal V1 × T*r*3 × B13) ; the signals B14 and B15 are used for the count to get the code succession of the table 7.

If at the time of any of the two checkings which follow the detection of an error, the channel 1 of the frame 3 is reached without detecting an error, the flipflop B'13 resets (signal V1 × T$r$3) and the same occurs for the flipflops B'14 and B'15 when the signal V1 × T$r$3 appears four frames, later.

After three checkings having given an error, the junction is declared out of synchronism and a signal RS said "synchronization search (FIG. 18.$a$) appears when the channel counter steps into channel 9 (condition B14 × B15 × B1).

The stepping into CV9 has been obtained by a forced setting of the channel counter by the signal PV9 appearing for the condition B14 × B15 × $\overline{\text{B1}}$ (FIG. 18.$b$). As the signal Sy corresponding to the condition $\overline{\text{B14}}$ + $\overline{\text{B15}}$ does not appear, the same occurs for the signal N (FIG. 7.$b$) so that the channel counter can only step up when some conditions are fulfilled. The frame counter (FIG. 8) steps up by one position when, the junction being synchronized (signal S$y$), the signal V24 appears ; when the junction is out of synchronism, the signal V24 disappears during the channel 2 of the frame 3 so that the frame counter stays in frame 3 during the whole duration of the search. It only steps in frame 4 if the junction being resynchronized, the signal V24 of the frame 3 appears.

During the search of the code CS$y$, the channel counter only steps up if the signal F corresponds to the digit that is to be received for the channel the code of which is displayed by the counter. So, the channel counter steps from the code CV9 to the code CV10 when the signal F corresponds to a 1, that is to say for the condition RS × F × V9 (FIG. 7.$b$). The channel counter steps from an even channel to the following channel when the signal F corresponds to a 1 and when the signal V9 is not present, that is to say for the condition B5 × F × $\overline{\text{V9}}$ × RS ; it steps from an odd channel, except channel 9, to an even channel when the signal F corresponds to a 0, that is to say for the condition $\overline{\text{B5}}$ × $\overline{\text{F}}$ × $\overline{\text{V9}}$ × RS. When the signal F does not correspond to the expected digit, the channel counter goes back either in CV9 or in CV11 according to the signal F. So, if an even channel is processed (signal B5) and if the signal F is a 0 instead of a 1, the channel counter is set in CV9 by the signal PV9 resulting of the condition RS × B5 × $\overline{\text{F}}$ (FIG. 18.$b$). In the same way, if an odd channel is processed (signal $\overline{\text{B5}}$), except channel 9, and if the signal is a 1 instead of a 0, this digit 1 is considered as that corresponding to the channel 10 and therefore it is considered that the following channel will be the channel 11; consequently, the channel counter is set in CV11 by the signal PV11 resulting from the condition $\overline{\text{V9}}$ × $\overline{\text{B5}}$ × F × RS (FIG. 18.$b$).

When the channel counter sets in CV24 and when the signal F corresponds to a 1, the circuit for search of the code CSy provides a signal ST resulting of the condition F × V24 × RS (FIG. 18.$a$). This signal ST means that the code CS$y$ has been detected and therefore that the junction is resynchronized. This signal ST is used to set a given number of flipflops so that their states correspond to a synchronized junction. That is particularly the case of the flipflops B'14 and B'15 (FIG. 11) used to count the checkings, which are reset so that the signal S$y$ (FIG. 9.$b$) appears. This signal ST is also applied to the flipflops B'6 and B'7 (FIG. 8) so that they display the code 10 corresponding to the frame 3. By supplying the signal ST to the frame counter and to the checking counter, one takes into account at the same time the starting during which the digits $b$6, $b$7, $b$14 and $b$15 have any value.

If any desynchronixation is such that the first digit of each line of the phase corrector memory does not correspond to the first digit of each channel message, it is impossible to detect the synchronization code CS$y$. To detect it, one has provided for shifting the writing in a line of the phase corrector by one position, for example by jumping from the position k4 to the position $k$6 when recording a line of the phase corrector. Consequently, all the digits received after the jump wil be shifted by a row to the right. When searching for the code CS$y$, this jump is made at regular intervals and it is understood that the duration $t$1 of this interval must at least be equal to that of four frames plus 16 channels to be sure to detect the code CS$y$ on one hand complete and on the other hand without cutting due to the jump from $k$4 to $k$6, for the said jump is made at any time and therefore may occur at the time of the reception of the first digit of the code CS$y$. As the duration of this interval is measured with the signals HC, the frequence of which can be higher than that of the signals HJ, an interval of five frames will actually be measured.

This counter by five has not been represented and one has assumed that it provided a signal T1 every five frames, the said signal being then used to control the jump from $k$4 to $k$6 of the selector 113 of the FIG. 3. On this FIG. 3, the jump control circuit associated with each junction has been represented. So, if the junction N$n$ defined by the signal $mn$ is in the period for searching the code CS$y$ (signal RS) and if the signal T1 appears, that means that a jump from $k$4 to $k$6 must be made. As the signal S resulting from the condition RS × T1 × mn occurs at any time with respect to the signals $k$1 through $k$8, it is stored in the flipflop S1, so that it is used at the right time.

The state 1 of the flipflop S1 is transferred at the time $k$2 into the flipflop S2; the signal S2 of the state l of the flipflop S2 is applied at the time $k$4 on one hand to the flipflop S1 to reset it, and on the other hand to the selector 113 so that the following signal Y causes it to step into the position $k$6 instead of the position $k$5. The signal k6 resets the flipflop S2 if the flipflop S1 is in the O state.

When the amount of desynchronization is such that the first digit of each channel code is actually recorded in the second memory point of each line (worst case), the number of shifts to be made so that it appears in the first memory point of each line is equal to seven, which corresponds to a duration 8$tl$, which means fourty frames or five milliseconds. So the maximum time needed to recover the synchronization is 5 milliseconds ; if after a delay equal to three times this maximum time, the code CS$y$ has not been detected, the junction is declared out of order. This delay is actually measured with a signal T2 of period $t2 = 5$ milliseconds and with the digits b16 and $b$17. At each signal T2, the counter made of the flipflops B'16 and B'17 (FIG. 12) and the associated electronic gates steps up once (condition T2 × RS). After three signals T2, the flipflops B'16 and B'17 display the code 11 the decoding of which gives the signal out of order HS which is used to prevent the transfer of the channel messages towards the group data memory (FIG. 4).

However, the signal HS does not prevent the continuation of the search for the code CS$y$ so that if the code CS$y$ is detected, the signal ST (FIG. 18.$a$) appears and puts back ino the synchronized working state a given number of flipflops as seen previously, and also the flipflops B'16 and B'17.

This invention has been described in the particular case of a phase corrector of $v = 3$ lines and a group data memory of $g = p \times m = 192$ lines, however it is understood that the invention also applies to synchronization circuits in which the number of lines of the phase corrector and/or of the group data memory is different ; particularly, one may increase the number of lines of the phase corrector and decrease the number of lines of the group data memory.

While the principles of the above invention have been described in connection with specific embodiments and particular modifications thereof it is to be clearly understood that this description is made by way of example and not as a limitation of the scope of the invention.

SUMMARY

Synchronization circuits located at the input of each central exchange of a PCM network transmitting p-digits messages characterized by the following points :

1. One constitutes groups of *p* junctions in which a particular digit time slot is reserved to process the received messages on each junction.
2. The received messages on a junction are written in a phase corrector, then transferred in a group data memory ; the addresses in the phase corrector and the group data memory are selected by instructions provided by an ordinal group instruction memory with a cyclic exploitation ;
3. For each junction, the amplitude of the drift is measured and when this one overtakes a given amplitude, an information on the sign of the error is elaborated and written in an error memory with a cyclic exploitation ;
4. The information cyclically extracted from the error memory are used to modify the stepping up of the reading line selector of the phase corrector and of the writing selector of the group data memory ;
5. The synchronization code is made of the first digit of the messages of the channels 9 through 24 of a frame comprising twenty four channels, the said code only appearing once every four frames ;
6. A checking circuit of the synchronization code, usd in time multiplex by the *p* junctions of a group, provides a fault information when the junction under processing is out of synchronism ;
7. A circuit of search of the synchronization code used in time multiplex for *p* junctions of a group, is designed to search the synchronization during five frames ; if, at the end of this delay, the synchronization code has not been detected, the writing column selector of the phase corrector steps up by one position ; this jump is repeated every five frames until the detection of the synchronization code.

What we claiim is:

1. In a pulse code modulation switching system, a time division control including means for transmitting and receiving coded signals over a plurality of bidirectional trunks, said trunks being combined into groups, each group having a predetermined number of trunks with a predetermined plurality of channels per trunk, said signals comprising speech signals in the form of multi-bit serial binary messages, a data memory for each trunk, the data memories of a group being combined into a group memory, the invention comprising a plurality of synchronization control circuits with one such circuit being allotted to each group and with each such circuit having a plurality of time slot storage areas equal to the number of trunks in the group, said group memory including a group instruction memory for each group allotted to the synchronization circuit for that group, means for transmitting a plural digit synchronization code for each trunk group with channel data messages, said synchronization circuits including: means for continuously checking the synchronization code of a plurality of trunks and for continuously storing said code for each trunk in the respective group instruction memory, means for cyclically reading the group instruction memories for each group, means for cyclically coupling each instruction memory with the time slot storage areas of the synchronization circuit for that group, comparator means responsive to a predetermined plurality of errors between a synchronizing circuit and the group instruction memory for emitting an error signal, and a correction means modifying the time interval of the reading of the messages associated with any channel responsive to an error signal.

2. A system as claimed in claim 1, wherein each said data memory comprises a buffer memory associated with said correction means, and said correction means controls the timing of the reading of messages from said buffer memory responsive to an error signal.

* * * * *